Oct. 11, 1932.  H. KINKEL  1,882,328
BLADE FOR HACK SAWS
Filed Sept. 4, 1931

Patented Oct. 11, 1932

1,882,328

UNITED STATES PATENT OFFICE

HEINRICH KINKEL, OF REMSCHEID-VIERINGHAUSEN, GERMANY

BLADE FOR HACK SAWS

Application filed September 4, 1931, Serial No. 561,274, and in Germany September 9, 1930.

The general way to stretch the blade of the hack saw takes place with the aid of two apertures provided in the saw heads near the central line of the width, assuming that the tension will be distributed equally over its whole breadth. Exact tests however have proved the error of this and that with the great width in relation to the thickness of the blade, the presumed tension exists only in the central part, while in the cutting line and the back of the blade the tension is far less. In consequence of lack of tension at the line of teeth the blade will quiver with the reciprocating motion; it will easily bend and is apt to break under slight over pressure. In fact, very many more blades are broken than used up, on account of the vibration and the lack of tension.

The blades for the band saw, frame saw and other woodworking machines make use of different means and complicated constructions to get the highest tension in the cutting line of the teeth, all of them however are too expensive and impracticable to be used for hack saws. On the other hand it has been tried to make the holes of triangular instead of round form, but no satisfaction has come so far from this or any other attempt.

To overcome this obstacle I have invented a new blade for hack saws, which will bring the tension at once to the line of the cutting teeth without needing expensive structures or complicated means, simply by locating the apertures with which the blade is to be stretched in the frame from the central line into the line of the cutting teeth. To my knowledge no such blades have been used so far, the practical results of which give high satisfaction.

Figure 1:
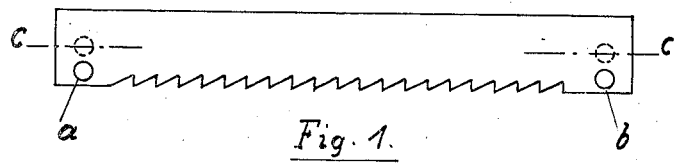

In the affixed drawing different forms of such blades are depicted:

In Fig. 1 a straight hack saw is illustrated.

Figure 2:
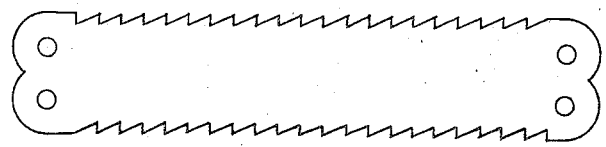

In Fig. 2 the blade with double cutting teeth on both edges is shown.

The practical form of the straight blade had up to now the apertures in the central line $c$, drawn in dotted lines, while in the new form these holes $a$ and $b$ are located as far as possible towards the line of the cutting teeth $d$, so, while tensioning the blade with the frame of the hack saw, the cutting part $d$ of the blade will receive the highest tension.

It is known to use blades with cutting teeth on both edges. For this kind of blade the present invention will be carried out in accordance with Fig. 2, by making two holes in each saw head, so that any of the blade being used, the nearer apertures in the saw heads will afford to give this side the higher tension.

Having thus described my invention, what I claim as new, is what follows:

1. In a blade for hack saws, apertures for tensioning said blade located at each end of the blade and out of the longitudinal center line thereof, in the one third part of the blade width toward the teeth, so that the teeth receive the maximum tension, the blade width being measured from the back edge of the blade to the foot-line of the teeth.

2. In a double edge blade for hack saws having two saw heads, a set of tensioning apertures in each saw head, so that by using the apertures nearer the cutting teeth, said teeth receive a higher tension than the teeth not in use.

In testimony whereof, I affix my signature.

HEINRICH KINKEL.